United States Patent
Lin et al.

(10) Patent No.: US 11,860,310 B2
(45) Date of Patent: Jan. 2, 2024

(54) EMITTER DEVICE FOR AN OPTICAL DETECTION APPARATUS, OPTICAL DETECTION APPARATUS, MOTOR VEHICLE AND METHOD

(71) Applicant: Valeo Schalter und Sensoren GmbH, Bietigheim-Bissingen (DE)

(72) Inventors: Lin Lin, Bietigheim-Bissingen (DE); Peter Horvath, Bietigheim-Bissingen (DE); Thomas Schuler, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 1290 days.

(21) Appl. No.: 16/334,997

(22) PCT Filed: Sep. 19, 2017

(86) PCT No.: PCT/EP2017/073556
§ 371 (c)(1),
(2) Date: Mar. 20, 2019

(87) PCT Pub. No.: WO2018/054870
PCT Pub. Date: Mar. 29, 2018

(65) Prior Publication Data
US 2019/0277951 A1 Sep. 12, 2019

(30) Foreign Application Priority Data

Sep. 22, 2016 (DE) ............ 10 2016 117 851.9

(51) Int. Cl.
*G01S 7/481* (2006.01)
*G01S 7/497* (2006.01)
(Continued)

(52) U.S. Cl.
CPC .......... *G01S 7/4817* (2013.01); *G01S 7/4813* (2013.01); *G01S 7/4815* (2013.01); *G01S 7/497* (2013.01);
(Continued)

(58) Field of Classification Search
CPC .... G01S 7/4813; G01S 7/4814; G01S 7/4815; G01S 7/4817; G01S 7/484; G01S 7/497;
(Continued)

(56) References Cited

U.S. PATENT DOCUMENTS 3,781,111 A * 12/1973 Fletcher ................ G01S 17/10
356/141.5
6,437,897 B1 * 8/2002 Inagaki ................ G02B 26/125
359/205.1
(Continued)

FOREIGN PATENT DOCUMENTS

CN       101055429 A      10/2007
DE   10 2009 021764 A1    12/2010
(Continued)

OTHER PUBLICATIONS

First Office Action in corresponding Chinese Application No. 201780065322.6, dated Aug. 23, 2022 (28 pages).
(Continued)

*Primary Examiner* — Yuqing Xiao
*Assistant Examiner* — Benjamin Richard Hebert
(74) *Attorney, Agent, or Firm* — Osha Bergman Watanabe & Burton LLP

(57) ABSTRACT

The invention relates to an emitter device (8) for an optical detection apparatus (3) of a motor vehicle (1), which is configured in order to scan a surrounding region (4) of the motor vehicle (1) by means of a light beam (10), and which comprises a light source (13) for emitting the light beam (10) and a guiding unit (15), the guiding unit (15) being config-
(Continued)

ured in order to guide the light beam (10) emitted onto the guiding unit (15) by the light source (13) at different scanning angles ($\alpha$). The light source (13) for emitting the light beam (10) comprises at least two separately driveable emitter elements (13a, 13b), which are configured in order to emit the light beam (10) onto the guiding unit (15) at angles of incidence ($\gamma1$, $\gamma2$) corresponding to predetermined setpoint values ($-\alpha3$, $-\alpha2$, $-\alpha1$, $\alpha0$, $+\alpha1$, $+\alpha2$, $+\alpha3$) of the scanning angle ($\alpha$) in order to generate a predetermined setpoint field of view (16) of the emitter device (8). The invention furthermore relates to an optical detection apparatus (3), to a motor vehicle (1) having at least one optical detection apparatus (3) and to a method for generating a setpoint field of view (16) for an emitter device (8) of an optical detection apparatus (3) of a motor vehicle (1).

13 Claims, 5 Drawing Sheets

(51) Int. Cl.
*G01S 17/42* (2006.01)
*G02B 26/10* (2006.01)
*G01S 17/931* (2020.01)

(52) U.S. Cl.
CPC ............ *G01S 17/42* (2013.01); *G01S 17/931* (2020.01); *G02B 26/10* (2013.01)

(58) Field of Classification Search
CPC .......... G01S 17/10; G01S 17/42; G01S 17/93; G01S 17/931; G02B 5/09; G02B 26/0816; G02B 26/10; G02B 26/12; G02B 26/126; G02B 27/09
See application file for complete search history.

(56) References Cited

U.S. PATENT DOCUMENTS

| | | | |
|---|---|---|---|
| 2007/0064291 A1* | 3/2007 | Kashimura | B41J 2/473 359/204.1 |
| 2007/0242253 A1 | 10/2007 | Visser et al. | |
| 2012/0249996 A1* | 10/2012 | Tanaka | G01S 17/42 356/4.01 |
| 2015/0009485 A1* | 1/2015 | Mheen | G01S 7/4817 356/4.01 |
| 2015/0204977 A1* | 7/2015 | Sakai | G01S 17/931 356/4.01 |
| 2015/0331239 A1* | 11/2015 | Ando | G02B 27/01 359/631 |
| 2015/0338764 A1* | 11/2015 | Kodama | H04N 1/6091 347/118 |
| 2016/0182788 A1* | 6/2016 | Wan | H04N 5/2354 348/370 |

FOREIGN PATENT DOCUMENTS

| | | |
|---|---|---|
| DE | 10 2009 047 303 A1 | 6/2011 |
| EP | 2680031 A1 | 1/2014 |

OTHER PUBLICATIONS

Herman Wenner et al. "Driver Assistance System Manual", 1st Edition, Beijing Institute of Technology Press, pp. 214-216 (8 pages).
German Search Report in corresponding German Application No. 10 2016 117 581.9, dated Jul. 28, 2017 (6 pages).
International Search Report and Written Opinion in corresponding International Application No. PCT/EP2017/073556, dated Dec. 15, 2017 (11 pages).

* cited by examiner

EMITTER DEVICE FOR AN OPTICAL DETECTION APPARATUS, OPTICAL DETECTION APPARATUS, MOTOR VEHICLE AND METHOD

The invention relates to an emitter device for an optical detection apparatus of a motor vehicle, which is configured in order to scan a surrounding region of the motor vehicle by means of a light beam, and which comprises a light source for emitting the light beam and a guiding unit, the guiding unit being configured in order to guide the light beam emitted onto the guiding unit by the light source into the surrounding region at different scanning angles. The invention furthermore relates to an optical detection apparatus for a motor vehicle, to a motor vehicle having at least one such optical detection apparatus and to a method.

In the present case, the interest is on optical detection apparatuses for motor vehicles, in particular on laser scanners. In this case, it is known to monitor a surrounding region of the motor vehicle by means of the optical detection apparatus. By means of the detection apparatus, objects in the surrounding region of the motor vehicle can be detected and information about the detected objects, for example a relative position of the objects with respect to the motor vehicle, can be provided to a driver assistance system of the motor vehicle. On the basis of this information, the driver assistance system may for example initiate measures to avoid a collision of the motor vehicle with the object, for example automatically brake the motor vehicle before the collision.

In laser scanners according to the prior art, a light beam, for example a laser beam, is conventionally emitted into the surrounding region by a light source of an emitter device of the laser scanner, for example of a laser diode, and the surrounding region is scanned by varying a scanning angle, or a scanning direction along which the light beam is guided. As soon as the light beam strikes an object in the surrounding region, at least a part of the light beam is reflected at the object back to the laser scanner. A receiver device of the laser scanner receives the reflected part of the light beam and, with the aid of a time of flight of the light beam or a time period between the emission of the light beam and the reception of the reflected part of the light beam, determines a distance of the object from the vehicle. With knowledge of the scanning angle during emission of the light beam, it is furthermore possible to determine an orientation or direction of the object with respect to the motor vehicle. The relative position of the object with respect to the motor vehicle can then be determined from the orientation and the distance.

In order to vary the scanning angle, the light beam is conventionally guided by a guiding unit of the emitter device. The guiding unit is in this case generally configured as a rotatable or tiltable mirror, which reflects the light beam in the different scanning directions, the scanning direction being adjusted by means of a tilt angle, or an orientation, of the tiltable mirror. An angle range in the surrounding region, within which the light beam is guided into the surrounding region, then forms a field of view of the emitter device. This field of view should ideally have a particularly large aperture angle and a particular setpoint shape. In order to increase the aperture angle, there is therefore conventionally an angle between the light beam striking the mirror and the light beam reflected by the mirror, i.e. the scanning direction. The effect of this can be that an actual shape of the field of view deviates from the setpoint shape of the field of view, i.e. the field of view of the emitter device is distorted. Although minor distortions can be compensated for on the software side by not using particular regions of the field of view, the optical detection apparatus according to the prior art has a low efficiency and high losses since these regions still continue to be illuminated by the light beam.

It is an object of the present invention to provide a solution to how an optical detection apparatus for a motor vehicle can be configured particularly efficiently and with low losses.

This object is achieved according to the invention by an emitter device, an optical detection apparatus, a motor vehicle and a method according to the respective independent patent claims. Advantageous embodiments of the invention are the subject matter of the dependent patent claims, the description and the figures.

According to one embodiment of an emitter device according to the invention for an optical detection apparatus of a motor vehicle, this emitter device is configured in order to scan a surrounding region of the motor vehicle by means of a light beam. The emitter device may comprise a light source for emitting the light beam and a guiding unit, the guiding unit being configured in order to guide the light beam emitted onto the guiding unit by the light source into the surrounding region at different scanning angles. In particular, the light source for emitting the light beam comprises at least two separately driveable emitter elements, which are configured in order to emit the light beam onto the guiding unit at angles of incidence corresponding to predetermined setpoint values of the scanning angle in order to generate a predetermined setpoint field of view of the emitter device.

Preferably, an emitter device according to the invention for an optical detection apparatus of a motor vehicle is configured in order to scan a surrounding region of the motor vehicle by means of a light beam. The emitter device comprises a light source for emitting the light beam and a guiding unit, the guiding unit being configured in order to guide the light beam emitted onto the guiding unit by the light source into the surrounding region at different scanning angles. The light source for emitting the light beam furthermore comprises at least two separately driveable emitter elements, which are configured in order to emit the light beam onto the guiding unit at angles of incidence corresponding to predetermined setpoint values of the scanning angle in order to generate a predetermined setpoint field of view of the emitter device.

By means of the optical detection apparatus, which is in particular configured as a Lidar system (Lidar—"Light Detection and Ranging") or as a laser scanner, the surrounding region of the motor vehicle can be monitored, for example by detecting objects or obstacles for the motor vehicle in the surrounding region. To this end, the optical detection apparatus comprises the emitter device, which comprises the light source for generating the light beam, in particular a laser beam. The guiding unit guides the light beam in order to provide a scanning movement at the different scanning angles. This means that, in order to scan the surrounding region, the light beam is emitted successively, or sequentially, by the emitter device in different scanning directions. In other words, this means that the scanning angle at which the light beam is emitted into the surrounding region is varied stepwise. During a first measurement, or at a first measurement instant, the light beam is guided in a first scanning direction, during a subsequent second measurement, or at a subsequent second measurement instant, the light beam is guided in a second scanning direction, etc. By the guiding of the light beam at the different scanning angles, an angle range in the surrounding region of the motor vehicle is illuminated which forms the field of view of the emitter device, in particular the field of view of the optical detection apparatus. The scanning angle may in this case be specified as an angle by which the scanning direction deviates horizontally and/or vertically from a predetermined direction, for example a longitudinal direction of the motor vehicle. By means of the guiding unit, the light beam can in particular be guided horizontally and vertically, so that the surrounding region is scanned or swept in a grid fashion, i.e. in rows or in columns. The guiding unit may for example comprise a tiltable mirror, in particular a micromirror actuator, having a planar, flat reflective surface.

In order now to generate the predetermined setpoint field of view, which has a predetermined setpoint shape, for the various scanning angles setpoint values, i.e. setpoint scanning angles, are predetermined. Preferably, a plane of the setpoint field of view generated by means of the setpoint values for the scanning angle perpendicularly to a principal scanning direction of the emitter device is shaped rectangularly. The setpoint field of view extends starting from the emitter device along the principal scanning direction and has a pyramidal shape. This means that all planes parallel to a base face of the pyramid are configured rectangularly. In order to provide the setpoint values for the scanning angle, the light source comprises the at least two separately driveable emitter elements. The emitter elements may, for example, be configured as LEDs or laser diodes. The emitter elements may in this case respectively generate a light beam, or laser beam, the light beams being emitted in different directions as a function of the emitter element generating the light beam, and therefore striking the guiding unit at different angles of incidence. A first direction of the light beam onto the guiding unit is assigned a first angle of incidence, a second direction is assigned a second angle of incidence, etc. The scanning direction along which the guiding unit guides the light beam can be influenced by the angles of incidence.

The invention is based in this case on the discovery that, for example in the case of a guiding unit having a tiltable mirror comprising the flat reflective surface, the field of view of the emitter device may be distorted by the tiltable mirror, in particular by the angle between the conventionally fixed incidence direction onto the tiltable mirror and the scanning direction, since the actual values of the scanning angle which are provided by the planar surface do not correspond to the setpoint values. An actual shape of the field of view therefore deviates from the setpoint shape. Such a distorted actual shape may, for example, be formed by a fan-shaped plane of the field of view perpendicularly to the principal scanning direction. This distortion can be prevented or compensated for by the two separately driveable emitter elements, by the angle of incidence onto the guiding unit being adapted to the setpoint value to be generated for the scanning angle. In other words, the angle of incidence is selected in such a way that, after the guiding of the light beam, the latter is emitted at the respective setpoint value for the scanning angle.

By the light source with the separately driveable emitter elements, it is thus possible to ensure that the illuminated angle range can be fully utilized, and objects in this region can be detected securely and reliably. By means of the emitter device, a particularly efficient and low-loss optical detection apparatus for a motor vehicle can thus be produced.

Preferably, the emitter device comprises a control unit, which is configured in order to drive at least a first of the emitter elements to emit the light beam for setpoint values of the scanning angle from a first value range, and in order to drive at least a second of the emitter elements to emit the light beam for setpoint values of the scanning angle from a second value range. Each value range in this case comprises at least one setpoint value for the scanning angle. By the at least one currently active emitter element, the angle of incidence of the light beam onto the guiding unit can thus be influenced and a deviation between the setpoint value and the actual value of the guiding angle, induced by the tiltable mirror, can therefore already be at least reduced during emission of the light beam.

Preferably, the light source in this case comprises a matrix arrangement of separately driveable emitter elements. The light source thus comprises an array of emitter elements, for example laser diodes, which are for example arranged in rows or in columns on a carrier. Each emitter element is in this case, in particular, addressable by means of the row in which the emitter element is located and by means of the column in which the emitter element is located, and driveable in order to generate the light beam with the currently required angle of incidence.

In particular, each setpoint value for the scanning angle is assigned a particular number of emitter elements, which have a particular position in the matrix arrangement. This means that a plurality of emitter elements are driven in order to generate the light beam with the required angle of incidence. The respective emitter elements, which are driven in order to generate the angle of incidence corresponding to the current setpoint value for the scanning angle for the emission, are in this case in particular arranged adjacently, so that each setpoint value for the angle of incidence is assigned an active region, corresponding thereto, of the matrix arrangement. The active regions in this case have, in particular, an unequal arrangement of emitter elements. A drive strategy for the emitter elements, comprising a number and position, associated with the respective setpoint values for the scanning angle, of the emitter elements, may for example be predetermined and stored for the control unit. By the matrix arrangement with the separately, or individually, driveable emitter elements, the light beam having the angle of incidence corresponding to the current setpoint value for the scanning angle can be generated with a high accuracy.

In one refinement of the invention, the guiding unit comprises a tiltable mirror, which is configured in order to guide the light beam emitted by the respective emitter element at the setpoint value for the scanning angle which corresponds to the respective angle of incidence. The tiltable mirror is, in particular, configured as a micromirror actuator, or MEMS mirror (MEMS—Microelectromechanical System), which comprises a flat, planar reflective surface. The tiltable mirror is thus arranged in an optical path, or emission path, in such a way that the light beam emitted by the light source at a particular angle of incidence is reflected at the tiltable mirror into the surrounding region, and in this case is reflected into the surrounding region with the setpoint value, corresponding to the angle of incidence, for the scanning angle.

In this case, in particular, the angles of incidence of the light beam, which are provided by the emitter elements, are predetermined as a function of tilt angles of the tiltable mirror. In order to generate the scanning movement, the tiltable mirror is successively oriented along a different direction, by varying the tilt angle stepwise. This tiltable mirror reflects the light beam as a function of the current tilt angle, or of a current position of the tiltable mirror, conventionally along particular actual values for the scanning angle. In this case, particularly beyond a particular size of the setpoint values of the scanning angle, the actual value provided by the tiltable mirror may deviate from the setpoint value. Without compensation for this deviation, an actual field of view of the emitter device is obtained which is distorted relative to the setpoint field of view. This distortion may, however, advantageously be compensated for by means of the separately, or individually, driveable emitter elements, by the setpoint value for the scanning angle being adjusted by means of the angle of incidence of the light beam onto the tiltable mirror.

In particular, the tiltable mirror has a characteristic transfer function, by which a distortion of an actual field of view generated by the tiltable mirror with respect to the setpoint field of view is described as a function of the tilt angles of the tiltable mirror, wherein the emitter elements for providing the respective angle of incidence of the light beam are arranged in such a way that an inverse of the characteristic transfer function is provided by the angle of incidence. The distortion is in this case determined with the aid of a deviation of shapes of planes of the actual field of view and of the setpoint field of view perpendicularly to a principal scanning direction of the emitter device.

In order to determine the drive strategy, i.e. in order to determine which emitter element or which emitter elements per measurement is or are driven to emit the light beam, the transfer function of the tiltable mirror is initially determined. To this end, for example, the uncompensated actual field of view generated by the emitter device with only one emitter element may be recorded, or determined. In particular, in this case the shape of the plane of the actual field of view perpendicularly to the principal scanning direction of the emitter device is determined. The plane of the actual field of view generated by the tiltable mirror is conventionally fan-shaped, while conversely the plane of the setpoint field of view is rectangular. This relation between the shape of the setpoint field of view and the shape of the actual field of view may be described by means of the transfer function, which in particular is dependent on the tilt angles of the tiltable mirror. As the transfer function, in particular that function by which the setpoint shape of the field of view is converted into the actual shape of the field of view is thus determined. In other words, the setpoint shape of the field of view, to which the transfer function is applied, gives the actual shape of the field of view. With knowledge of the transfer function, the drive strategy may be determined in such a way that the transfer function is inverted by the respective angles of incidence and the distortion is consequently compensated for. The actual shape of the field of view, to which the inverse transfer function is applied, thus gives the setpoint shape of the field of view. By determination of the transfer function and of the inverse transfer function, the drive strategy for the light source can thus advantageously be adapted ideally to the tiltable mirror and the setpoint field of view can consequently be generated.

In one advantageous embodiment of the invention, the guiding unit additionally comprises a freeform mirror having a reflective freeform face for reflecting the light beam reflected by the tiltable mirror, the freeform mirror being configured in order to compensate for a deviation of an actual value for the scanning angle, generated by the tiltable mirror, from the setpoint value for the scanning angle. This means that, in addition to the tiltable mirror, the guiding unit comprises the freeform mirror, which in particular is arranged statically in the guiding unit. According to this embodiment, the guiding unit thus comprises the tiltable mirror and the freeform mirror, the light beam being emitted by the light source at the respective angle of incidence first onto the tiltable mirror. This tiltable mirror reflects the light beam as a function of the current tilt angle, or of a current position of the tiltable mirror, at particular actual values for the scanning angle, which may deviate from the setpoint values despite the adapted angles of incidence. This means that, for example, the deviation cannot be fully compensated for by the provision of the different angles of incidence.

This deviation, however, may advantageously be compensated for fully by means of the freeform mirror. The freeform mirror is in this case installed in a fixed manner, or statically, in the emitter device, i.e. nonrotatably or nontiltably, and comprises in particular at least two surface elements with different angles of inclination. One surface of the freeform mirror is in particular curved at least in regions. The freeform mirror may modify an orientation of the light beam for those actual values of the scanning angle which deviate from the associated setpoint values. The freeform mirror then reflects the light beam into the surrounding region. The freeform mirror may thus advantageously likewise contribute to undistorting the field of view of the emitter device. Provision of the freeform mirror is particularly advantageous when the field of view distorted by the tiltable mirror cannot be undistorted only by means of the drive strategy of the light source.

As an alternative or in addition, in order to provide the setpoint values for the scanning angle, the emitter device may additionally comprise a lens element having a freeform face for transmitting the light beam guided by the guiding unit into the surrounding region, the lens element being configured in order to compensate for a deviation of the actual value, generated by the guiding unit, from the setpoint value for the scanning angle. This means that the emitter device additionally comprises the lens element having the freeform face, i.e. a freeform lens, which is, arranged in an optical path between the guiding unit and the surrounding region. This means that, before emission into the surrounding region, the light beam reflected by the guiding unit passes through the lens element, which is optically transparent for the light beam reflected by the guiding unit. The lens element in this case comprises a freeform face, the surface elements of which have different angles of inclination and by which the orientation of the light beam, i.e. the scanning angle, can be adjusted. The freeform lens, the surface of which is in particular curved at least in regions, can modify the value of the scanning angle during transmission, if the actual value does not correspond to the setpoint value for the scanning angle. This may, for example, happen when the deviation between the actual values and the setpoint values cannot fully be compensated for by the drive strategy of the light source and/or by the freeform mirror. By means of the freeform lens, the field of view of the emitter device can thus likewise advantageously be undistorted.

In particular, angles of inclination of surface elements of the freeform face of the freeform mirror and/or of the lens element, corresponding to the setpoint values for the scanning angle, are predetermined, each setpoint value for the scanning angle being assigned a surface element for guiding the light beam at the respective setpoint value for the scanning angle. In the case of the freeform mirror, the angles of inclination of the surface elements are selected in such a way that the incident light beam is reflected at the respective setpoint scanning angle corresponding to the current measurement. This means that, in order to generate a particular setpoint value for the scanning angle, i.e. in order to guide the light beam along the predetermined setpoint scanning direction, the light beam is reflected at that surface element by whose angle of inclination the light beam can be guided in the corresponding setpoint scanning direction. In the case of the lens element, or of the freeform lens, each setpoint value for the scanning angle is assigned a surface element of the freeform face for transmitting the light beam at the respective setpoint value for the scanning angle. In other words, in order to provide a particular setpoint scanning angle, the light beam emitted by the light source is transmitted through the associated surface element. By the freeform face, it is thus likewise possible to ensure that the illuminated angle range can be fully utilized, and objects in this region can be detected securely and reliably.

The invention furthermore relates to an optical detection apparatus, in particular a laser scanner, for a motor vehicle, for monitoring a surrounding region of the motor vehicle, having an emitter device according to the invention, or one embodiment of the emitter device according to the invention, and a receiver device. The receiver device is configured in order to receive a part of the light beam, reflected at an object in the surrounding region, and in order to determine a distance of the object from the motor vehicle with the aid of a time period between the emission of the light beam and the reception of the reflected part of the light beam.

A motor vehicle according to the invention comprises at least one optical detection apparatus. The motor vehicle is, in particular, configured as a car. The distance, detected by the detection apparatus, of the object may, for example, be provided to a control device of a driver assistance system of the motor vehicle, which for example allows at least semi-autonomous driving of the motor vehicle. For example, the motor vehicle may be braked automatically by the control device when it has been detected by the detection device that the distance of the object from the motor vehicle falls below a predetermined distance threshold value.

The invention furthermore relates to a method for generating a setpoint field of view for an emitter device of an optical detection apparatus of a motor vehicle. According to one embodiment of the method, a light source for emitting the light beam and a guiding unit are provided for the emitter device, a light beam emitted onto the guiding unit by the light source being able to be guided at different scanning angles by means of the guiding unit. In particular, at least two separately driveable emitter elements for emitting the light beam are provided for the light source, the emitter elements emitting the light beam onto the guiding unit at angles of incidence corresponding to predetermined setpoint values of the scanning angle in order to generate a predetermined setpoint field of view of the emitter device.

In the method, a light source for emitting the light beam and a guiding unit are preferably provided for the emitter device, a light beam emitted onto the guiding unit by the light source being guided along different scanning angles by means of the guiding unit. Furthermore, at least two separately driveable emitter elements for emitting the light beam are provided for the light source, the emitter elements emitting the light beam onto the guiding unit at angles of incidence corresponding to predetermined setpoint values of the scanning angle in order to generate a predetermined setpoint field of view of the emitter device.

In particular, the emitter device is manufactured with a guiding unit comprising a tiltable mirror and the freeform mirror. In order to determine a drive strategy which specifies those emitter elements that are driven per measurement in order to generate the setpoint field of view, a transfer function for the tiltable mirror is determined, which describes a deviation of a shape of an actual field of view of the emitter device from a shape of the setpoint field of view. The emitter elements, which can generate the light beam with the angle of incidence associated with the current setpoint value, are in this case driven in such a way that an inverse of the transfer function is provided by them.

The preferred embodiments presented above with reference to the emitter device according to the invention, and their advantages, apply correspondingly for the optical detection apparatus according to the invention, the motor vehicle according to the invention and for the method according to the invention.

Other features of the invention may be found in the claims, the figures and the description of the figures. The features and feature combinations mentioned above in the description, as well as the features and feature combinations mentioned below in the description of the figures and/or only shown in the figures may be used not only in the combination respectively indicated, but also in other combinations or separately, without departing from the scope of the invention. Therefore, embodiments of the invention which are not explicitly shown in the figures and explained, but derive and may be produced by separate feature combinations from the embodiments explained, are therefore also to be regarded as included and disclosed. Embodiments and feature combinations which consequently do not have all features of an originally formulated independent claim are also to be regarded as disclosed. Furthermore, embodiments and feature combinations, in particular through the embodiments explained above, which extend beyond or differ from the feature combinations explained in the back-references of the claims, are to be regarded as disclosed.

In the figures, elements which are the same and functionally equivalent are provided with the same references.

Figure 1:
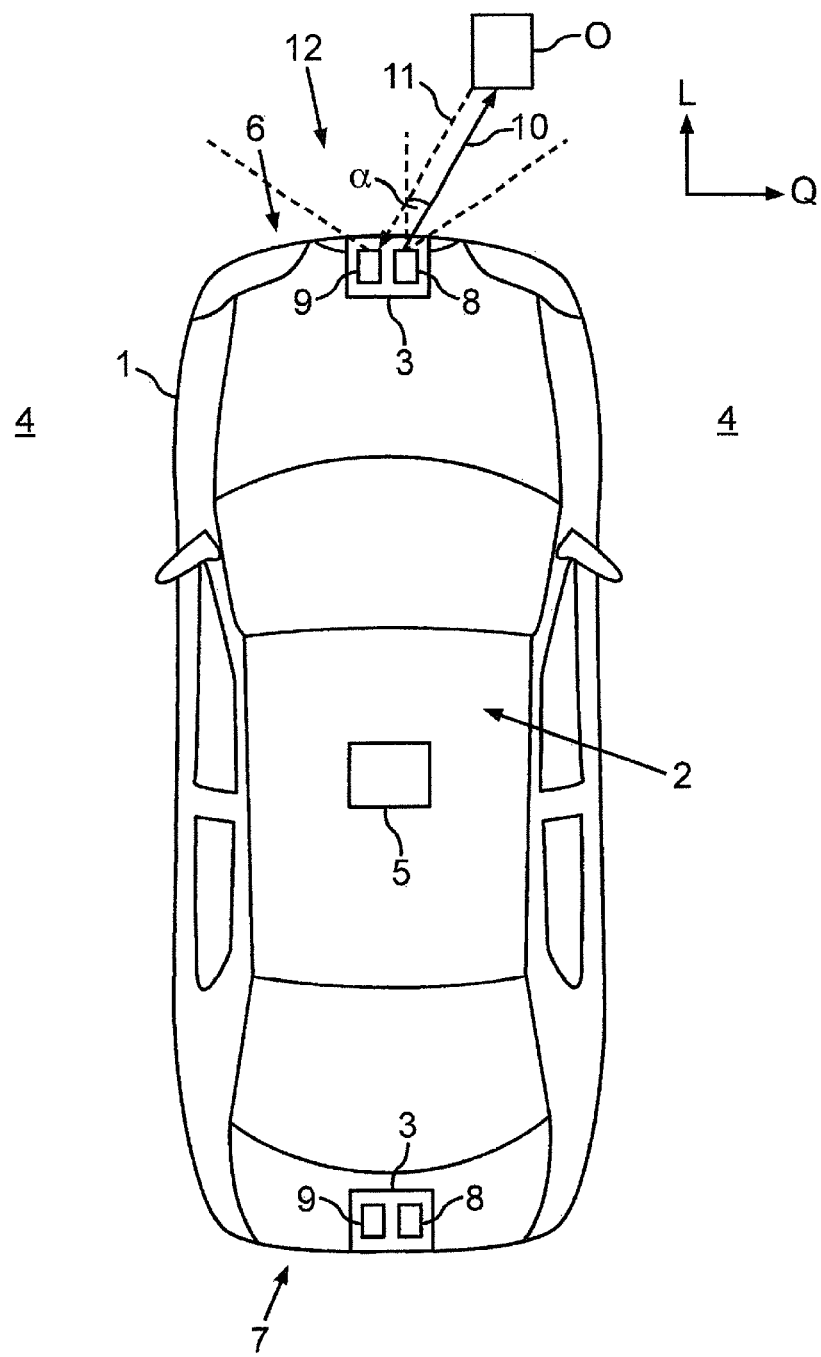
FIG. 1 shows a schematic representation of one embodiment of a motor vehicle according to the invention.

FIG. 1 shows a motor vehicle 1 according to the present invention. In the present case, the motor vehicle 1 is configured as a car. The motor vehicle 1 comprises a driver assistance system 2, which is configured in order to assist a driver of the motor vehicle 1 during driving of the motor vehicle 1. The driver assistance system 2 comprises at least one optical detection apparatus 3, which is configured in order to monitor a surrounding region 4 of the motor vehicle 1. In particular, by means of the detection apparatus 3a distance and an orientation of an object O in the surrounding region 4 of the motor vehicle 1 can be recorded, and for example provided to a control device 5 of the driver assistance system 2. The control device 5 may, for example, automatically brake the motor vehicle 1 for collision avoidance, if the distance of the object O falls below a predetermined threshold value. In the present case, the driver assistance system 2 comprises two detection apparatuses 3, a first detection apparatus 3 being arranged in a front region 6 of the motor vehicle 1 and being used to monitor the surrounding region 4 in front of the motor vehicle 1, and a second detection apparatus 3 being arranged in a rear region 7 of the motor vehicle 1 and being used to monitor the surrounding region 4 behind the motor vehicle 1. Further detection apparatuses 3 may also be provided, for example in side regions of the motor vehicle 1.

The optical detection apparatus 3 is in the present case configured as a laser scanner and comprises an emitter device 8 as well as a receiver device 9. The emitter device emits a light beam 10 into the surrounding region 4, and the receiver device 9 receives a part 11, reflected at the object O, of the light beam 10. The receiver device 9 may record the distance of the object O with the aid of a time of flight between the emission of the light beam 10 and the reception of the reflected part 11 of the light beam 10. The light beam 10 is in this case emitted successively, or stepwise, at various scanning angles $\alpha$. In this way, the surrounding region 4 is scanned in a grid fashion by means of the light beam 10. According to FIG. 1, horizontal components of the scanning angle $\alpha$ are shown in a horizontal plane spanned by a longitudinal direction L of the vehicle and a transverse direction Q of the vehicle. The horizontal component of the scanning angle $\alpha$ and a vertical component (not shown here) of the scanning angle $\alpha$ in a plane spanned by the longitudinal direction L of the vehicle and a vertical direction of the vehicle are known to the emitter device 8, so that an orientation, or direction, of the object O relative to the motor vehicle 1 is also known. An angle range 12 in the surrounding region 4, which is illuminated by means of the light beam 10 oriented in different scanning directions, forms a field of view of the emitter device 8.

Figure 2:
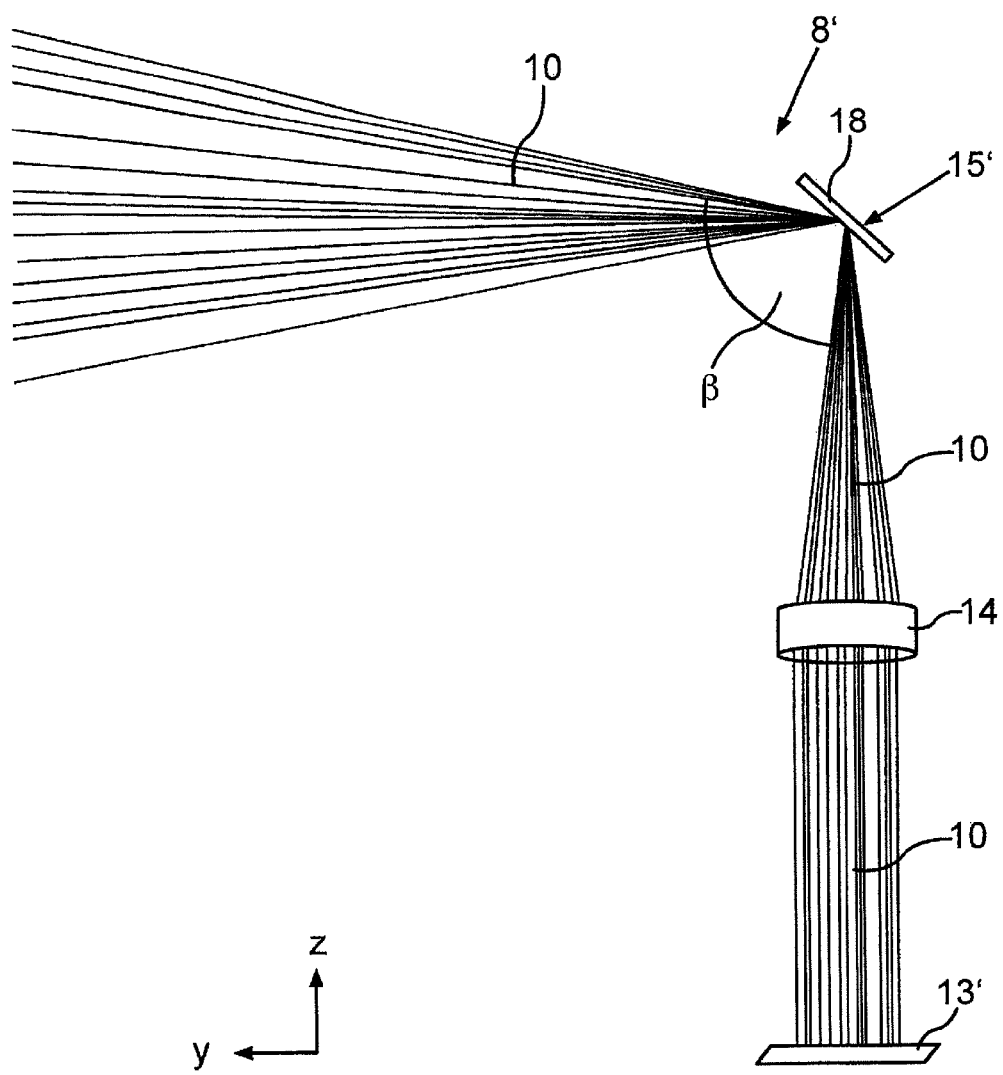
FIG. 2 shows a schematic representation of an emitter device of an optical detection apparatus according to the prior art.

FIG. 2 shows an emitter device 8' according to the prior art. The emitter device 8' comprises a light source 13', which is configured in order to emit the light beam 10. Furthermore, the emitter device 8' comprises a collimator 14 which collimates the light beam 10. The collimated light beam 10 is emitted onto a guiding unit 15' consisting of a tiltable mirror 18, which in this case is configured as a micromirror actuator, or MEMS mirror. The tiltable mirror 18 is used in order to guide the light beam 10 into the surrounding region 4 at the different scanning angles $\alpha$. In order to generate the field of view, which has a particularly large aperture angle, for example 150°, there is an angle difference $\beta$ between an incidence direction of the light beam 10, which in this case is oriented along the z direction, and the scanning direction, which in this case is oriented along the y direction: the angle $\beta$ is in this case for example 90°.

Figure 3:
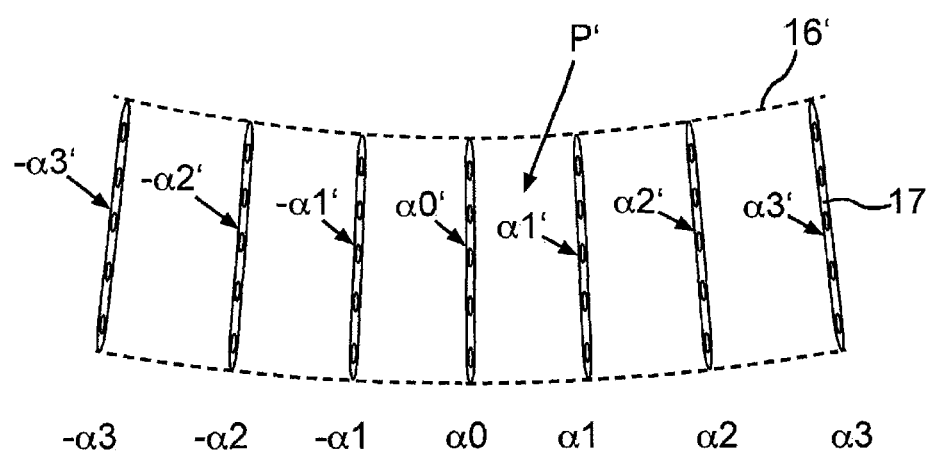
FIG. 3 shows a schematic representation of an actual field of view of the emitter device according to FIG. 2.

The emitter device 8' according to the prior art results in an actual field of view 16' which is shown in FIG. 3. The actual field of view 16' has an actual shape P' and in the present case is configured in a fan shape. In FIG. 3, illumination strips 17 for various setpoint values $-\alpha 3$, $-\alpha 2$, $-\alpha 1$, $\alpha 0$, $+\alpha 1$, $+\alpha 2$, $+\alpha 3$ of the scanning angle $\alpha$ are in this case shown. Each illumination strip 17 characterizes an actual value $-\alpha 3'$, $-\alpha 2'$, $-\alpha 1'$, $\alpha 0'$, $+\alpha 1'$, $+\alpha 2'$, $+\alpha 3'$ of the scanning angle $\alpha$, which corresponds to a column illuminated by the light beam 10 on a target face (Target) at a respective measurement instant, each measurement instant being assigned a setpoint value $-\alpha 3$ to $+\alpha 3$ for the scanning angle $\alpha$, at which the light beam 10 is intended to be emitted at this measurement instant. Ideally, i.e. when the actual values $-\alpha 3'$ to $+\alpha 3'$ provided by the guiding unit 15' in fact correspond to the setpoint values $-\alpha 3$ to $+\alpha 3$, the illumination strips 17 are oriented perpendicularly, so that a setpoint field of view 16 with a rectangular setpoint shape P (see FIG. 4) is formed. However, it can be seen that particularly the outer illumination strips 17 at the scanning angles $-\alpha 3$ and $+\alpha 3$, which form edges of the field of view 16', are not oriented perpendicularly, so that the fan-shaped actual field of view 16' is distorted relative to the setpoint field of view 16. With an increasing scanning angle $\alpha$, the distortion of the field of view 16' thus also increases.

Figure 4:
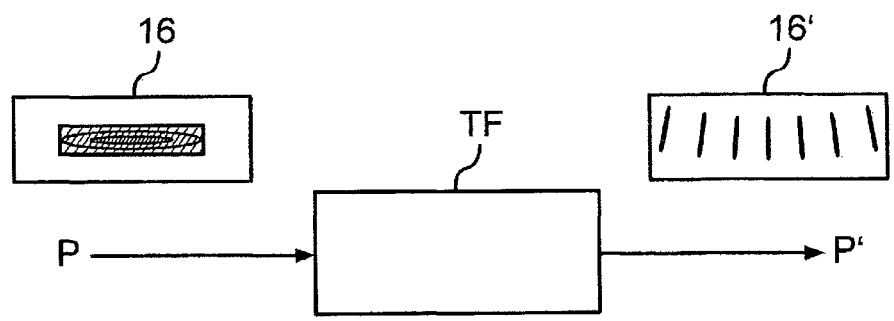
FIG. 4 shows a schematic representation of a relation between the actual field of view according to FIG. 3 and a setpoint field of view.

FIG. 4 shows a relation between the setpoint shape P of the setpoint field of view 16 and the actual shape P' of the actual field of view 16'. In this case, the actual shape P' of the actual field of view 16' is coupled by means of a transfer function TF with the setpoint shape P of the setpoint field of view 16 according to the formula P*TF=P'. The transfer function TF in this case describes the distortion of the actual field of view 16' with respect to the setpoint field of view 16, or the deviation of the actual values $-\alpha 3'$ to $+\alpha 3'$ of the scanning angle $\alpha$ from the setpoint values $-\alpha 3$ to $+\alpha 3$ of the scanning angle $\alpha$, which is caused by the tiltable mirror 18.

Figure 5:
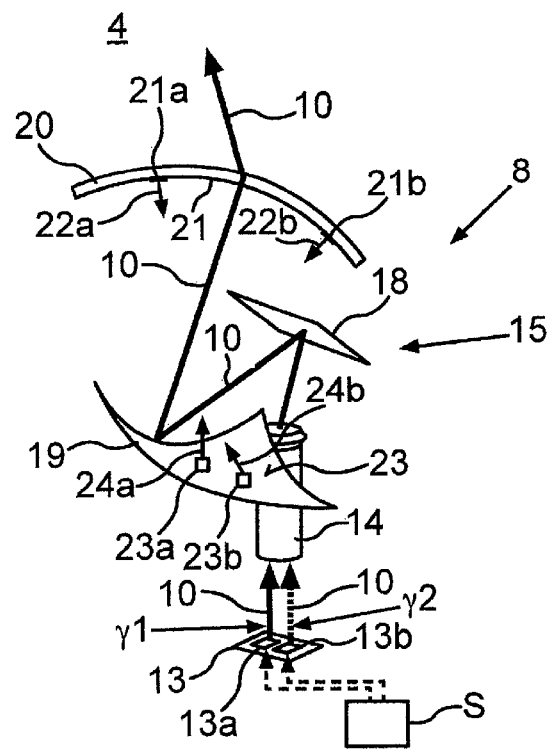
FIG. 5 shows a schematic representation of one embodiment of an emitter device according to the invention for an optical detection apparatus.

In order now to convert the actual field of view 16' into the setpoint field of view 16, an inverse transfer function RTF is determined, so that the formula P*(TF*RTF)=P, or P'*RTF=P, applies. In order to provide the inverse transfer function RTF, an emitter device 8 as shown in FIG. 5 is provided for the optical detection apparatus 3. The emitter device 8 in this case has a light source 13, which comprises at least two emitter elements 13a, 13b. The emitter elements 13a, 13b are for example laser diodes or LEDs, and can be driven separately, for example by a control unit S, to emit the light beam 10. The light beams 10 emitted by the emitter elements 13a, 13b in this case have different directions, so that they strike the guiding unit 15 at different angles of incidence $\gamma 1$, $\gamma 2$. Each angle of incidence $\gamma 1$, $\gamma 2$ is in this case assigned one of the setpoint values $-\alpha 3$ to $+\alpha 3$ for the scanning angle $\alpha$, so that the guiding unit can reflect the light beam 10 incident at the respective angle of incidence $\gamma 1$, $\gamma 2$ at the associated setpoint values $-\alpha 3$ to $+\alpha 3$ for the scanning angle $\alpha$, and can therefore compensate for the deviation between the actual values $-\alpha 3'$ to $+\alpha 3'$, generated by the guiding unit 15, of the scanning angle $\alpha$ and the setpoint values $-\alpha 3$ to $+\alpha 3$ of the scanning angle $\alpha$.

Furthermore, the emitter device 8 in this case comprises a freeform mirror 19, which is arranged in the guiding unit 15 in addition to the tiltable mirror 18, as well as a lens element 20. The light beam 10 generated by the light source 13 is initially emitted onto the tiltable mirror 18, which reflects the light beam 10 onto the freeform mirror 19. The freeform mirror 19 is configured in order to reflect the light beam 10 onto the lens element 20, which comprises a freeform face 21. The freeform mirror 19 and the lens element 20 are configured in order to orientate the light beam 10 into the surrounding region 4 of the motor vehicle 1 in such a way that a deviation between the setpoint field of view 16 and the actual field of view 16' can be fully compensated for, if this deviation cannot be compensated for by the angles of incidence $\gamma 1$, $\gamma 2$ of the light beam 10 emitted by the respective emitter elements 13a, 13b. To this end, surface elements 21a, 21b of the freeform face 21 of the freeform lens 20 have different angles of inclination 22a, 22b, or different inclination directions. Surface elements 23a, 23b of a reflective freeform face 23 of the freeform mirror 19 also have different angles of inclination 24a, 24b. In this case, each angle of inclination 22a, 22b, 24a, 24b may be assigned a setpoint value $-\alpha 3$ to $+\alpha 3$ for the scanning angle $\alpha$, so that the respective surface element 21a, 21b of the lens element 20 transmits the light beam 10 at the assigned setpoint values $-\alpha3$ to $+\alpha3$ for the scanning angle $\alpha$ and/or the respective surface element 24a, 24b of the freeform mirror 19 reflects the light beam 10 at the assigned setpoint values $-\alpha3$ to $+\alpha3$ for the scanning angle $\alpha$. The surface elements 24a, 24b may thus modify a direction of the light beam 10 incident on the respective surface element 21a, 21b. The freeform face 21, 23 has the inverse transfer function RTF. In other words, the inverse transfer function RTF is produced by means of the angles of inclination 22a, 22b, 24a, 24b of the surface elements 21a, 21b, 23a, 23b of the freeform face 21, 23. The angles of inclination 22a, 22b, 24a, 24b of the surface elements 21a, 21b, 23a, 23b are determined as a function of the tilt angles of the tiltable mirror 18, and therefore as a function of the setpoint values $-\alpha3$ to $+\alpha3$, respectively to be provided, of the scanning angle $\alpha$.

According to FIG. 5, the light beam 10 is thus initially emitted by at least one of the emitter elements 13a, 13b at an angle of incidence $\gamma1$, $\gamma2$ corresponding to the current setpoint value $-\alpha3$ to $+\alpha3$ for the scanning angle $\alpha$ onto the tiltable mirror 18, which reflects the light beam 10 onto the freeform mirror 19. In the case of an existing deviation between the actual values $-\alpha3'$ to $+\alpha3'$ provided by the tiltable mirror 18 and the setpoint values $-\alpha3$ to $+\alpha3$ of the scanning angle $\alpha$, this may at least reduce the deviation by the light beam 10 being reflected at that surface element 23a, 23b which is assigned to the respective setpoint value $-\alpha3$ to $+\alpha3$ of the scanning angle $\alpha$. The light beam 10 is in this case reflected onto the lens element 20, which may modify the orientation of the light beam 10 during transmission, if, as before, there is a deviation between the actual values $-\alpha3'$ to $+\alpha3'$ provided by the freeform mirror 19 and the setpoint values $-\alpha3$ to $+\alpha3$ of the scanning angle $\alpha$. To this end, the light beam 10 is transmitted by that surface element 21a, 21b of the freeform lens 20 which corresponds to the current setpoint value $-\alpha3$ to $+\alpha3$ of the scanning angle $\alpha$.

Figure 6:
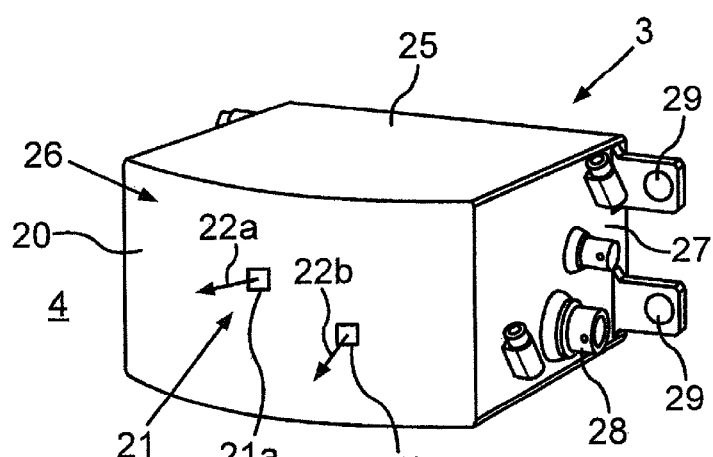
FIG. 6 shows a schematic representation of one embodiment of an optical detection apparatus according to the invention.

FIG. 6 shows an embodiment of the optical detection apparatus 3 configured as a laser scanner. The optical detection apparatus 3 comprises a housing 25, which encloses the emitter device 8 and the receiver device 9. A front side 26 of the housing 25, facing toward the surrounding region 4 in the installed state of the optical detection apparatus 3 on the motor vehicle 1, is in this case formed by the lens element 20 with the freeform face 21. The light beam 10 is thus in this case transmitted by the emitter device 8, arranged in an interior of the housing 25, through the freeform lens 20 into the surrounding region 4 and the part 11, reflected in the surrounding region 4, of the light beam 10 is transmitted from the surrounding region 4 to the receiver device 9 arranged in the interior of the housing 25. The housing 25 in this case furthermore comprises, in a side region 27, electrical connection elements 28 as well as fastening elements 29 for fastening the optical detection apparatus 3 on the motor vehicle 1.

Figure 7:
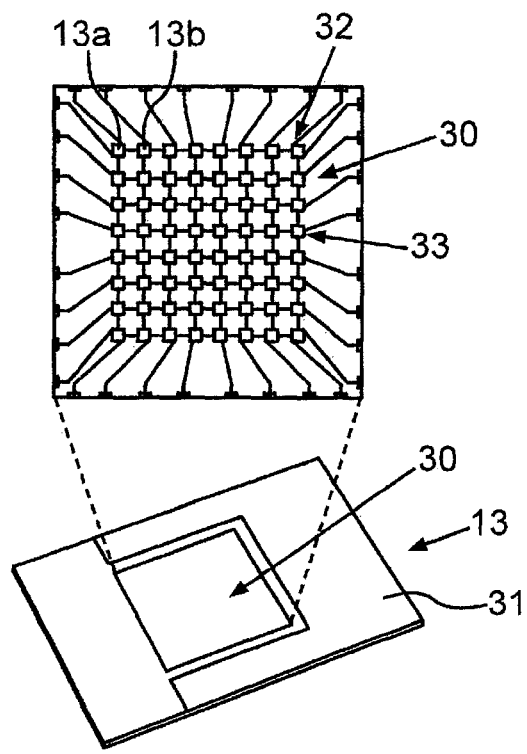
FIG. 7 shows a schematic representation of one embodiment of a light source of the emitter device.
Figure 8:
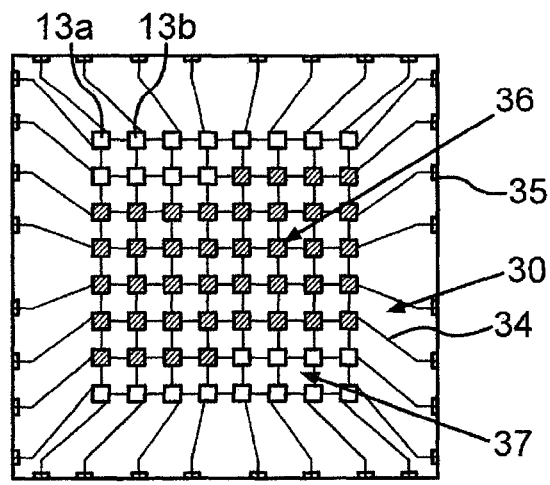
FIG. 8 shows a schematic representation of the light source according to FIG. 7 during the emission of a light beam.

FIG. 7 shows an embodiment of the light source 13, in which the emitter elements 13a, 13b are arranged in a matrix arrangement 30. The matrix arrangement 30, in which the emitter elements 13a, 13b are arranged in columns 32 and rows 33, is arranged on a carrier 31 of the light source 13. In FIG. 8, it can be seen that each row 33 and each column 32 is connected by means of a connecting element 34, for example a bond wire, to a contacting element 35, for example a solder pad, so that each emitter element 13a, 13b can be addressed separately, or individually, by means of the respective row 33 and the respective column 32 in which the emitter element 13a, 13b is located. The addressed emitter element 13a, 13b then emits the light beam 10. In this case, driving can be carried out on a plurality of emitter elements 13a, 13b to emit the light beam 10. In FIG. 8, it is shown that the emitter elements 13a, 13b of a region 36 emit the light beam 10, i.e. are active, whereas by contrast the emitter elements 13a, 13b of a region 37 are inactive. The region 36 may, for example, be active whenever a particular setpoint value $-\alpha3$ to $+\alpha3$ of the scanning angle $\alpha$ or a setpoint value $-\alpha3$ to $+\alpha3$ of the scanning angle $\alpha$ is intended to be generated from a particular value range. A drive strategy, as to when which emitter elements 13a, 13b are driven, or activated, to emit the light beam 10, may for example be predetermined as a function of the transfer function TF and stored for the control unit S.

The invention claimed is:

1. An emitter device for an optical detection apparatus of a motor vehicle configured to scan a surrounding region of the motor vehicle by a light beam, comprising:
   a light source for emitting the light beam; and
   a guiding unit for guiding the light beam emitted onto the guiding unit by the light source at different scanning angles,
   wherein the light source for emitting the light beam comprises at least two separately drivable emitter elements, which are configured to emit the light beam onto the guiding unit at angles of incidence corresponding to predetermined setpoint values of the scanning angle to generate a predetermined setpoint field of view of the emitter device,
   wherein the guiding unit comprises a tiltable mirror, which is configured in order to guide the light beam emitted by the respective emitter element at the setpoint value for the scanning angle which corresponds to the respective angle of incidence, and
   wherein the angles of incidence of the light beam, which are provided by the emitter elements, are predetermined as a function of tilt angles of the tiltable mirror,
   wherein the tiltable mirror has a characteristic transfer function, by which a distortion of an actual field of view generated by the tiltable mirror with respect to the setpoint field of view is described as a function of tilt angles of the tiltable mirror, and
   the emitter elements are driven via a drive strategy so that an inverse of the characteristic transfer function is provided by the angles of incidence.

2. The emitter device according to claim 1, wherein a plane of the setpoint field of view generated by the setpoint values for the scanning angle perpendicularly to a principal scanning direction of the emitter device is shaped rectangularly.

3. The emitter device according to claim 1, further comprising: a control unit configured to drive at least a first of the emitter elements to emit the light beam for setpoint values of the scanning angle from a first value range, and to drive at least a second of the emitter elements to emit the light beam for setpoint values of the scanning angle from a second value range.

4. The emitter device according to claim 1, wherein the light source comprises a matrix arrangement of separately drivable emitter elements.

5. The emitter device according to claim 4, wherein each setpoint value for the scanning angle is assigned a particular number of emitter elements, which have a particular position in the matrix arrangement.

6. The emitter device according to claim 1,
   wherein the respective angles of incidence of the light beam are configured to compensate for a distortion of an actual value, generated by the tiltable mirror of the tilt angle, from the setpoint value for the scanning angle.

7. The emitter device according to claim 6, wherein the distortion is determined with the aid of a deviation of shapes of planes of the actual field of view and of the setpoint field of view perpendicularly to a principal scanning direction of the emitter device.

8. The emitter device according to claim 1, wherein:
the guiding unit further comprises a freeform mirror having a reflective freeform face for reflecting the light beam reflected by the tiltable mirror, the freeform mirror being configured to compensate for a deviation of an actual value for the scanning angle, generated by the tiltable mirror, from the setpoint value for the scanning angle; and
the inverse of the characteristic transfer function is further provided by the reflective freeform face.

9. The emitter device according to claim 8, further comprising:
a lens element having a freeform face for transmitting the light beam guided by the guiding unit into the surrounding region, the lens element being configured to compensate for a deviation of an actual value, generated by the guiding unit, from the setpoint value for the scanning angle;
wherein the inverse of the characteristic function is further provided by the freeform face of the lens element.

10. The emitter device according to claim 8, wherein angles of inclination of surface elements of the freeform face, corresponding to the setpoint values for the scanning angle, are predetermined, each setpoint value for the scanning angle being assigned a surface element for guiding the light beam at the respective setpoint value for the scanning angle.

11. An optical detection apparatus for a motor vehicle, for monitoring a surrounding region of the motor vehicle, the optical detection apparatus comprising:
an emitter device according to claim 1; and
a receiver device that receives a part of the light beam, reflected at an object in the surrounding region,
wherein the optical detection apparatus determines a distance of the object from the motor vehicle with aid of a time period between the emission of the light beam and the reception of the reflected part of the light beam, and
wherein the optical detection apparatus is a laser scanner.

12. A motor vehicle comprising at least one optical detection apparatus according to claim 11.

13. A method for generating a setpoint field of view for an emitter device of an optical detection apparatus of a motor vehicle, wherein the emitter device comprises a light source for emitting a light beam and a guiding unit, the method comprising:
emitting the light beam onto the guiding unit by the light source; and
guiding the emitted light beam at different scanning angles by means of the guiding unit,
wherein at least two separately drivable emitter elements for emitting the light beam are provided for the light source, the emitter elements emitting the light beam onto the guiding unit at angles of incidence corresponding to predetermined setpoint values of the scanning angle to generate a predetermined setpoint field of view of the emitter device,
wherein the guiding unit comprises a tiltable mirror, which is configured in order to guide the light beam emitted by the respective emitter element at the setpoint value for the scanning angle which corresponds to the respective angle of incidence, and
wherein the angles of incidence of the light beam, which are provided by the emitter elements, are predetermined as a function of tilt angles of the tiltable mirror r,
wherein the tiltable mirror has a characteristic transfer function, by which a distortion of an actual field of view generated by the tiltable mirror with respect to the setpoint field of view is described as a function of tilt angles of the tiltable mirror, and
the emitter elements are driven via a drive strategy so that an inverse of the characteristic transfer function is provided by the angles of incidence.

* * * * *